United States Patent [19]
Akiyama

[11] Patent Number: 5,321,519
[45] Date of Patent: Jun. 14, 1994

[54] CROSSTALK DETECTOR FOR OPTICALLY READ SIGNALS

[75] Inventor: Toru Akiyama, Tokorozawa, Japan

[73] Assignee: Pioneer Electronic Corporation, Tokyo, Japan

[21] Appl. No.: 46,932

[22] Filed: Apr. 13, 1993

Related U.S. Application Data

[63] Continuation of Ser. No. 805,539, Dec. 11, 1991, abandoned.

[30] Foreign Application Priority Data

Dec. 18, 1990 [JP] Japan .................. 2-403098

[51] Int. Cl.$^5$ .................... H04N 5/76; H04N 5/84
[52] U.S. Cl. .................... 358/340; 358/335; 369/54; 369/124; 455/295; 348/614
[58] Field of Search ............... 358/328, 340, 336, 36, 358/37, 166, 167, 327, 310, 335; 360/33.1, 27; 369/54, 61, 62, 100, 111, 124; 455/295, 303, 306; H04N 5/76, 9/79; G11B 7/00

[56] References Cited

U.S. PATENT DOCUMENTS

| | | | |
|---|---|---|---|
| 4,456,930 | 6/1984 | Hashimoto | 358/340 |
| 4,491,877 | 1/1985 | Kanamaru | 358/336 |
| 4,745,486 | 5/1988 | Ohira et al. | 358/340 |
| 4,786,986 | 11/1988 | Yamanushi et al. | 360/33.1 |
| 4,852,074 | 7/1989 | Tanaka et al. | 358/328 |
| 4,907,293 | 3/1990 | Ueno | 455/295 |
| 5,032,915 | 7/1991 | Ichimura | 358/340 |

Primary Examiner—Tommy P. Chin
Assistant Examiner—Khoi Truong
Attorney, Agent, or Firm—Kane, Dalsimer, Sullivan, Kurucz, Levy, Eisele and Richard

[57] ABSTRACT

A crosstalk detector for detecting the crosstalk of signals optically read from a recording medium having a plurality of tracks. The read signal levels between adjacent tracks at the positions where crosstalk detecting signals are recorded are compared and used to calculate a quantity of crosstalk of the read signals.

8 Claims, 6 Drawing Sheets

CROSSTALK DETECTOR FOR OPTICALLY READ SIGNALS

This application is a continuation of application Ser. No. 07/805,539, filed Dec. 11, 1991, now abandoned.

BACKGROUND OF THE INVENTION

The present invention relates to a crosstalk quantity detector, and more particularly to a device for detecting a crosstalk quantity of signals optically read from a recording medium (e.g., optical disk, etc.,) having a plurality of tracks for recording information.

Hitherto, in optical disks such as laser video disks (LVD) etc., there is employed a so-called track structure such that signal bit trains are arranged in a spiral manner from the inner circumferential side of the optical disk toward the outer circumferential side thereof to record information. In such optical disks of the track structure, there is the problem of crosstalk that record information on a track adjacent to a track presently traced is mixed into a read signal for the track presently traced. As the cause of occurrence of crosstalk, it is pointed out that the following phenomenon would occur. Namely, the diameter of a spot of a laser beam for reading is definite. For this reason, in accordance with the relationship between the spot diameter and the interval between adjacent tracks, e.g., in such cases where the disk is tilted or inclined, when the laser beam deviates (positionally shifts) from the position of an object or a target track and is irradiated onto a track adjacent thereto, that laser beam may read record information on the adjacent track together with record information on the object track.

As the method of detecting such a crosstalk, there is conventionally known a method of detecting an inclination or tilt to indirectly detect a quantity of crosstalk.

This conventional crosstalk detecting method is shown in FIGS. 11 (A) and 11 (B). Namely, a light from a light emitting element 31 such as a light emitting diode, etc., is irradiated onto a disk 34 to receive a reflected light by two light receiving elements 32 and 33 arranged on the both side of the light emitting element 31 to compare output signal levels of the both light receiving elements 32 and 33 by a differential amplifier 35 to detect a tilt or inclination of the optical disk 34, thus to detect a quantity of crosstalk in dependency upon the degree of the tilt.

Namely, in the case where the light emitting element 31 and the light receiving elements 32 and 33 correctly face the optical disk 34 as shown in FIG. 11 (A), since quantities of light received by the light receiving elements 32 and 33 are the same, the output of the differential amplifier 35 is equal to zero. In contrast, in the case where the optical disk 34 is inclined or tilted as shown in FIG. 11 (B), since a quantity of light received by the light receiving element 32 is larger than that received by the light receiving element 33, the output of the differential amplifier 35 takes a positive value. Thus, a tilt or inclination can be detected.

However, in accordance with the above described method, there is a problem that it may take place that a portion of a light irradiated from the light emitting element 31 is not irradiated onto the optical disk at the peripheral portion thereof, failing to output a correct value. Further problems are that if the disk surface is stained, an erroneous detection may be carried out, that there exists unevenness between disks, and that an exclusive tilt or inclination sensor is required in addition to the pick up, with the result that the structure of the pick up becomes large.

On the other hand, it is strongly demanded to record, onto an optical disk, a wideband signal of a high vision TV (HDTV : High Definition TV), etc.. However, even if the rotational speed is increased under the present circumstances where there is employed a single track structure, there exists a limitation from a viewpoint of data capacity. In view of this, studies on the method of recording and reproducing a signal by using a plurality of (e.g. three) paralell tracks are being conducted.

In such optical disks in the plural track form, it is required for increasing the quantity of information to narrow the interval between tracks. However, if the track interval is narrowed, a quantity of crosstalk between adjacent tracks is increased. In this case, with the conventional crosstalk detecting method mentioned above, the accuracy and the reliability were of question.

SUMMARY OF THE INVENTION

The present invention has been made with a view to solve the above described problems, and its object is to provide a device adapted to process signals which have been read to thereby precisely detect a quantity or quantities of crosstalk without necessitating an exclusive disk tilt or inclination detection mechanism, etc..

To achieve the above mentioned object, as the first aspect of the invention, there is provided a crosstalk detector for detecting a quantity of crosstalk of signals optically read from an information recording medium having a plurality of parallel tracks by tracing the tracks on the information recording medium where crosstalk detecting signals different from each other are recorded at positions in correspondence with each other on the normal with respect to the tracks between adjacent tracks, the detector comprising means for comparing read signal levels between adjacent tracks at the positions where the crosstalk detecting signals are recorded to thereby calculate a quantity of crosstalk of the read signals.

In accordance with the first aspect of the invention, when information are optically read out by tracing respective tracks of a plurality of parallel tracks on the recording medium, positions (periods) where crosstalk detecting signals in the read signals are recorded are extracted. These crosstalk detecting signal periods are located at the same reading position on the recording medium. At each position, read signals extracted from respective adjacent tracks are subjected to comparative calculation at the calculation means. As a result, a mixing quantity of a signal from a track adjacent to a target or an object track to be read into a read signal of the object track, i.e., a quantity of crosstalk is detected.

As the second aspect of the invention, there is provided a detector for detecting a quantity of crosstalk of signals optically read from an information recording medium having a plurality of parallel tracks by tracing the tracks on the information recording medium where crosstalk detecting signals are recorded at positions which are not in correspondence with each other on the normal with respect to the tracks between adjacent tracks, the detector comprising means for comparing read signal levels between adjacent tracks at the positions where the crosstalk detecting signals included in the read signals are recorded to thereby calculate a quantity of crosstalk of the read signals.

In accordance with the second aspect of the invention, the crosstalk detecting signals are recorded at the positions which are not in correspondence with each other on the normal with respect to the tracks between adjacent tracks. Accordingly, when read signals extracted from respective adjacent tracks at the same reading position are subjected to comparative calculation by the calculation means, it is possible to detect a quantity of crosstalk of a signal from an adjacent track into a read signal of a track to be read in the same manner as in the above mentioned first aspect of the invention.

As stated above, in accordance with the present invention, even in the case where there is employed either a CAV (Constant Angular Velocity) disk or a CLV (Constant Linear Velocity) disk, it is possible to detect a crosstalk with a plurality of tracks being related to each other. As a result, no exclusive disk tilt mechanism etc., is required.

DESCRIPTION OF THE PREFERRED EMBODIMENT

Preferred embodiments of the present invention will now be described with reference to the attached drawings.

First Embodiment

Figure 1:
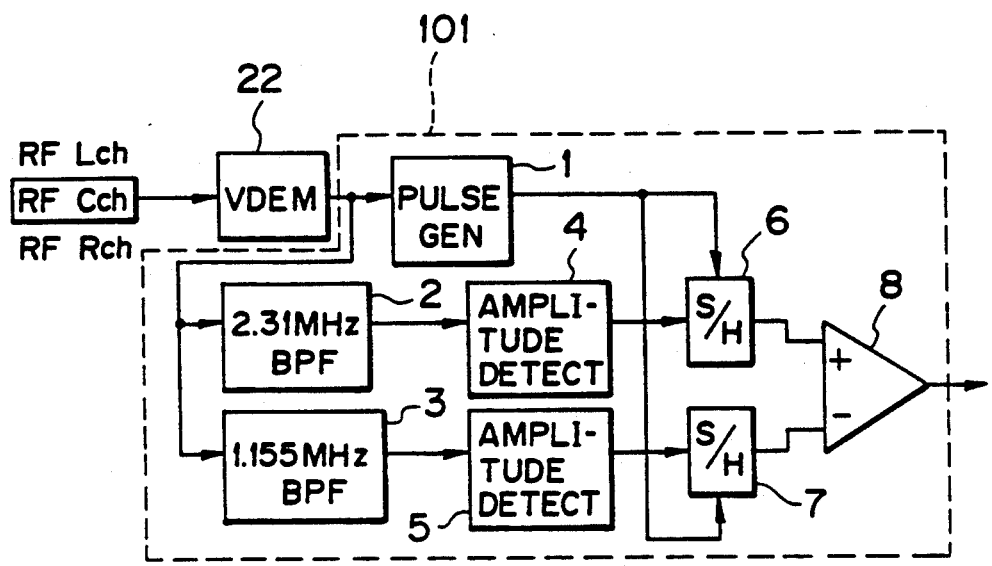
FIG. 1 is a block diagram showing the circuit configuration of a first embodiment of a crosstalk quantity detector according to the present invention.

Referring to FIG. 1, there is shown a first embodiment of a first aspect of the present invention. In this embodiment, there is shown an example where a crosstalk quantity detector of the first feature of the invention is applied to an optical disk having a plurality of tracks as a recording medium.

As shown in FIG. 1, this crosstalk quantity detector 101 includes a pulse generator 1, two band pass filters 2 and 3, two amplitude detectors 4 and 5, two sample hold circuits 6 and 7, and a differential amplifier 8.

An RF signal of the center channel is inputted to a video demodulation unit 22. The pulse generator 1 is connected to the output side of the video demodulation unit 22, and an output pulse from the pulse generator 1 is outputted to the sample hold circuits 6 and 7. The band-pass filters 2 and 3 are connected to the output side of the video demodulation unit 22, the amplitude detector 4 is connected to the band pass filter 2, and the amplitude detector 5 is connected to the output side of the band-pass filter 3. Further, the sample hold circuit 6 is connected to the output side of the amplifier detector 4, and the sample hold circuit 7 is connected to the output side of the amplitude detector 5. In addition, outputs from the sample hold circuits 6 and 7 are inputted to the differential amplifier 8.

Figure 2:
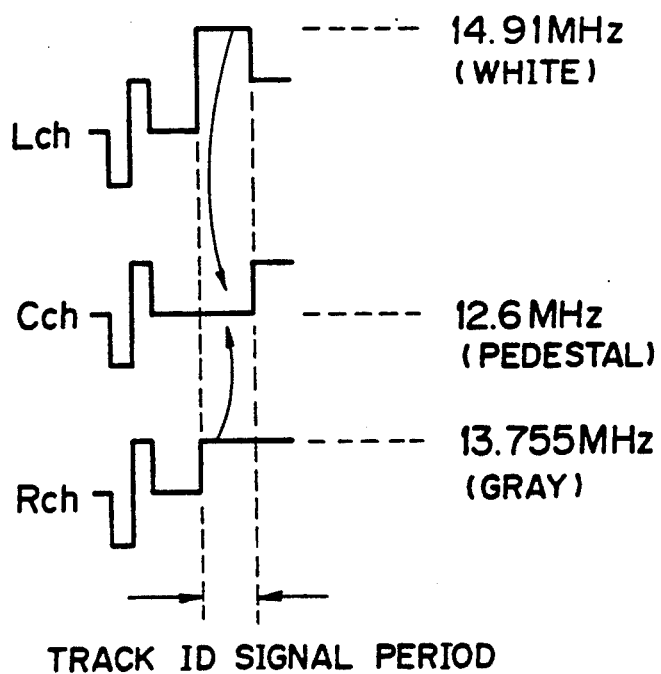
FIG. 2 is a waveform diagram for explaining the operation of the first embodiment.

The principle of the first embodiment will now be described with reference to FIG. 2 which shows an example of a video signal in the case where the number of the tracks is three. These three tracks (L channel, C channel, R channel) are simultaneously recorded and reproduced at all times. The L channel shows a signal of white level at frequency of 14.91 MHz, the C (center) channel shows a signal of pedestal level at a frequency of 12.6 MHz, and the R channel shows a signal of gray level at frequency of 13.755 MHz. The track ID signal is a track identification signal inserted in a horizontal blanking signal H-BLK in order to identify respective tracks of L, C and R, and L, C and R show different signal levels in the track ID signal period, respectively. The track ID signal corresponds to a crosstalk detected signal. Each track ID signal is formed at three positions in correspondence with each other on each normal with respect to each of three tracks.

In the C (center) channel, in the case where there is a crosstalk from the L channel, a signal of 2.31 MHz ($=14.91-12.6$) is detected, and in the case where there is a crosstalk from the R channel, a signal of 1.155 MHz ($=13.755-12.6$) is detected Accordingly if a servo control is conducted so that both the signal level of 2.31 MHz and the signal level of 1.155 MHz become minimum, a recording/reproducing such that the crosstalk is minimum can be conducted.

The operation of the first embodiment will now be described. In FIG. 1, a video signal of the center channel in the RF region is inputted to the video demodulation unit 22, at which it is demodulated. The demodulated signal thus. obtained is inputted to the band-pass filter 2. The band-pass filter 2 is a band-pass filter having a center frequency of 2.31 MHz, and serves to attenuate a signal of a frequency higher than 2.31 MHz and lower than that. An output from the band-pass filter 2 is subjected to amplitude detection by the amplitude detector 4, and is then inputted to the sample hold circuit 6.

Further, the video demodulated signal is also inputted to the band-pass filter 3. The band-pass filter 3 is a band-pass filter having a center frequency of 1.155 MHz. An output from the band-pass filter 3 is subjected to amplitude detection, and is then inputted to the sample hold circuit 7.

On the other hand, the demodulated signal is inputted to the pulse generator 1. The pulse generator 1 detects the period of the track ID signal of the video modulated signal to generate pulses to output them to the sample hold circuits 6 and 7. The sample hold circuits 6 and 7 sample and hold outputs from the amplitude detectors 4 and 5 at the timings of these pulses. In this instance, an output from the sample hold circuit 6 indicates a crosstalk component from the L channel to the C channel, and an output from the sample hold circuit 7 indicates a crosstalk component from the R channel to the C channel. Outputs from the sample hold circuits 6 and 7 which have been sampled and held are inputted to the differential amplifier 8. Thus, a difference between the output from the sample hold circuit 6 and the output from the sample hold circuit 7 is outputted. The difference shows a deviation of a pick up from the target track. In this way, a quantity of crosstalk into the C channel is detected as indicated by the above described principle.

Second Embodiment

Figure 4:
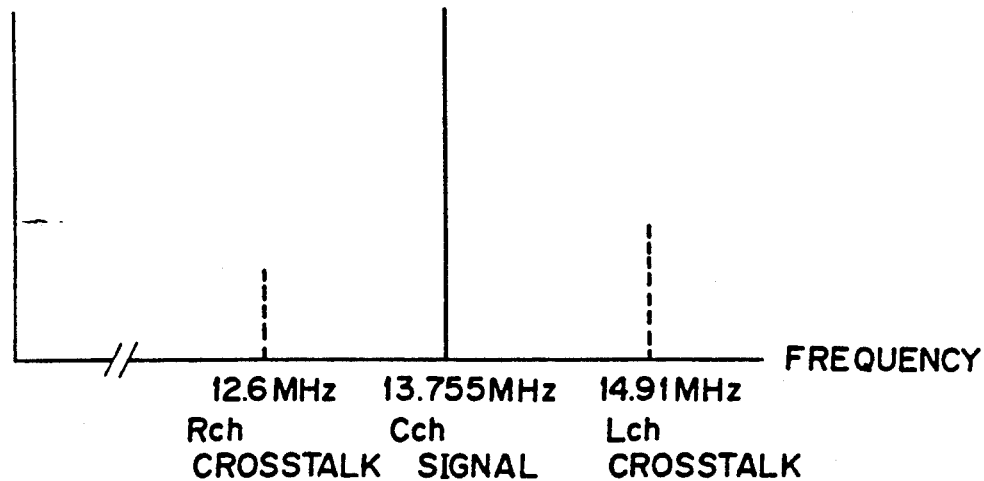
FIG. 4 is a graphical representation for explaining the operation of the second embodiment.

In the above described first embodiment, a quantity of crosstalk is detected from a video demodulated base band signal, i.e., a signal which has undergone video demodulation, but may be detected from a signal in the RF region, which has not undergone video demodulation. A second embodiment of a detector for detecting a quantity of crosstalk of a signal in the RF region will now be described. In this case, as shown in FIG. 4, there is indicated an example where the C channel, the L channel and the R channel are assumed as gray level (13.755 MHz), white level (14.91 MHz) and pedestal level (12.6 MHz), respectively.

Figure 3:
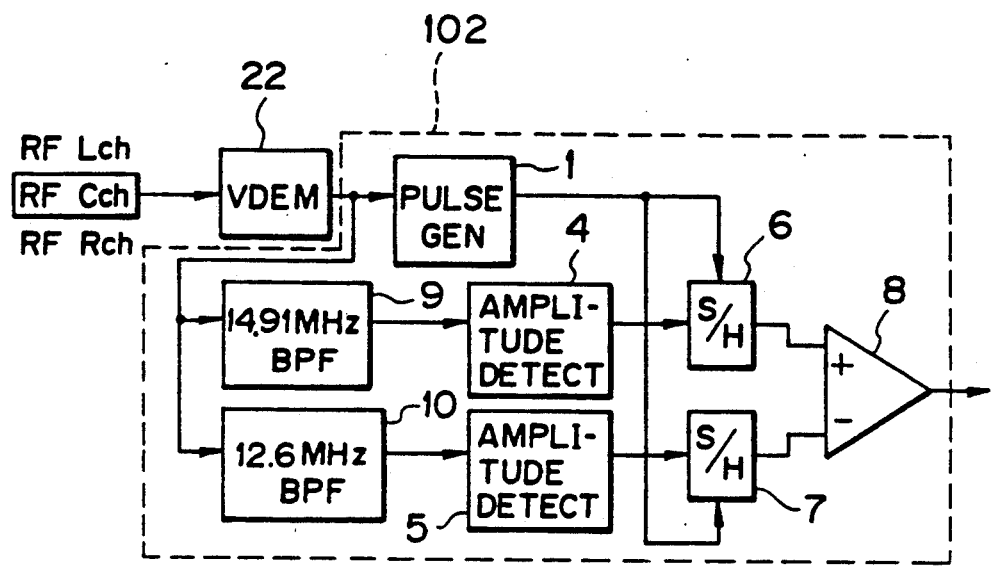
FIG. 3 is a block diagram showing the circuit configuration of a second embodiment of a crosstalk quantity detector according to the present invention.

Referring to FIG. 3, there is shown a second embodiment. In this embodiment, there is another example of a crosstalk quantity detector according to the first aspect. This crosstalk quantity detector 102 includes a pulse generator 1, band-pass filters 9 and 10, amplitude detectors 4 and 5, sample hold circuits 6 and 7, and a differential amplifier 8.

The second embodiment differs from the first embodiment, as shown in FIG. 3, in that the band-pass filter 9 is provided in place of the band-pass filter 2, that the band-pass filter 10 is provided in place of the band-pass filter 3, and that the input sides of the band-pass filters 9 and 10 are connected to the input side of the video demodulation unit 22. In this embodiment, the signal levels of the L and R channels are compared with each other before the RF signal of the center channel is demodulated. By employing such a circuit configuration as well, it is possible to detect a crosstalk component from the L channel to the C channel and a crosstalk component from the R channel to the C channel, and to detect a balance therebetween.

Third Embodiment

Figure 5:
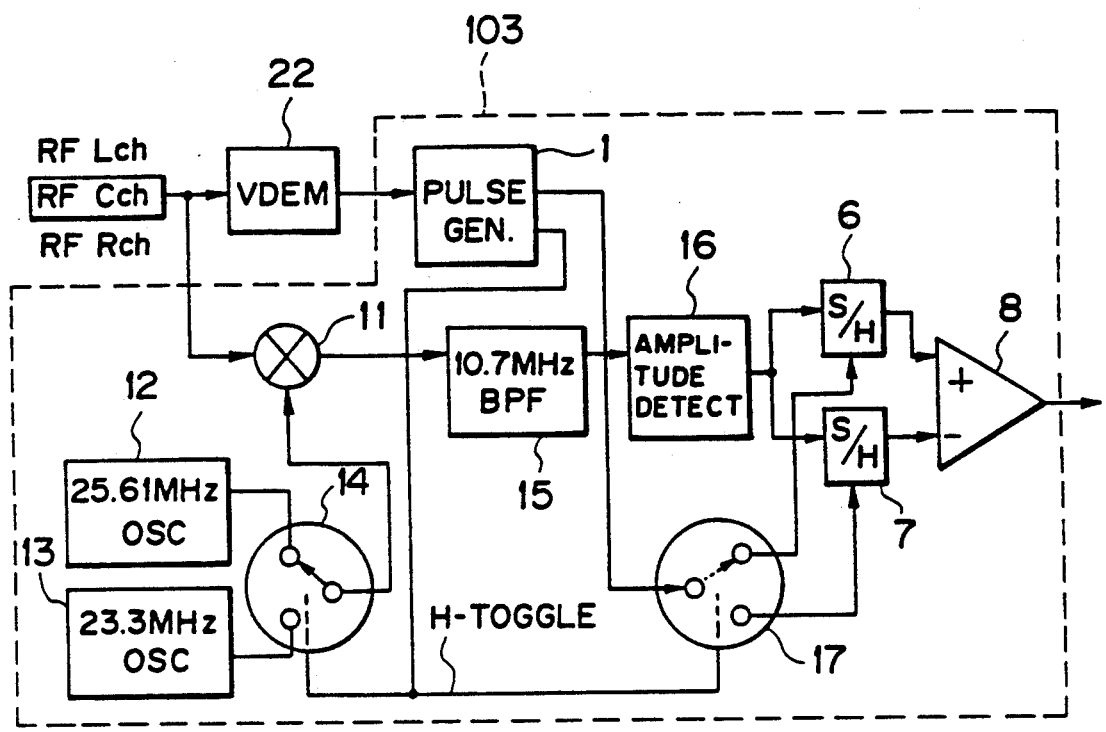
FIG. 5 is a block diagram showing the circuit configuration of a third embodiment of a crosstalk quantity detector according to the present invention.

A third embodiment of a crosstalk quantity detector according to the first aspect of the invention is shown in FIG. 5. As shown in FIG. 5, this crosstalk quantity detector 103 includes a pulse generator 1, a multiplier 11, oscillators 12 and 13, a changeover switch 14, a band-pass filter 15, an amplitude detector 16, a changeover switch two sample hold circuits 6 and 7, and a differential amplifier 8.

The pulse generator 1 is connected to the output side of the video demodulation unit 22. A pulse indicating the track ID period, which is an output from the pulse generator 1, is inputted to the changeover switch 17. Further, from the pulse generator 1, a pulse signal H-TOGGLE inverting every regenerative horizontal synchronizing signal is outputted as a control signal for changeover switches 17 and 14.

A signal in the RF region is taken out from the input side of the video demodulation unit 22, and is then inputted to the multiplier 11. Further, a signal having a frequency of 25.61 MHz (=14.91+10.7) is generated from the oscillator 12, and is then inputted to the changeover circuit 14. A signal having a frequency of 23.3 MHz (=12.6 +10.7) is generated from the oscillator 13, and is inputted to the changeover switch 14. The changeover switch 14 switches these input signals by the pulse signal H-TOGGLE from the pulse generator 1 to input a signal thus obtained by switching to the multiplier 11. The multiplier 11 multiplies a video signal in the RF region by a signal from the changeover switch 14 to output a signal obtained by multiplication to the band-pass filter 15. The multiplier 11 is called "heterodyne", which multiplies two signals having frequencies, for example, A=cos War by B=cos Wbt to calculate sum component (Wa+Wb) and difference component (Wa−Wb).

In this embodiment, when the signal having a frequency of 23.31 MHz is generated from the oscillator 13, Lch crosstalk having the frequency of 10.7 MHz of difference component between Wa=23.3 MHz and Wb=12.6 MHz is detected.

In the same way, when the signal having a frequency of 25.61 MHz is generated from the oscillator 13, Rch crosstalk having the frequency of 10.7 of difference component between Wa=25.61 MHz and Wb=14.91 MHz is detected. The band-pass filter 15 is a band-pass filter having a center frequency of 10.7 MHz, and serves to attenuate a signal having a frequency higher than 10.7 MHz and lower than that to output an attenuated signal to the amplitude detector 16. The amplitude detector 16 detects an amplitude from an output from the band-pass filter 15 to output the amplitude thus detected to the sample hold circuits 6 and 7.

The changeover switch 17 is subjected to switching control by the pulse signal H-TOGGLE. This switch interlocks with the changeover switch 14. Thus, when the changeover switch 14 is connected to the oscillator 12 side, the changeover switch 17 is connected to the sample hold circuit 6 side. On the other hand, when the changeover switch 14 is connected to the oscillator 13 side, the changeover switch 17 is connected to the sample hold circuit 7 side. Namely, the sample hold circuit 6 extracts a crosstalk component of the L channel, and the sample hold circuit 7 extracts a crosstalk component of the R channel. In this instance, an output from the differential amplifier 8 indicates a balance of a crosstalk quantity at the center channel.

In the example of such a heterodyne system, because the band-pass filter 15 is a widely used filter (10.7 MHz), implementation is easy and simple. In addition, since there is only one amplifier detector, it is advantageously provided that the influence of the circuit error is negligible.

Fourth Embodiment

Figure 6:
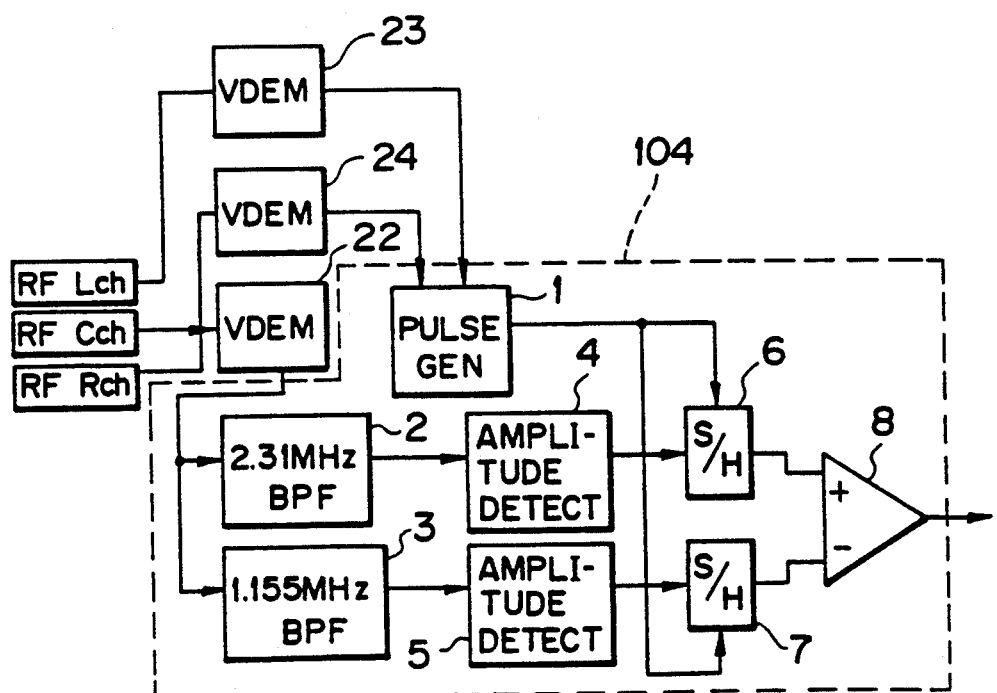
FIG. 6 is a block diagram showing the circuit configuration of a fourth embodiment of a crosstalk quantity detector according to the present invention.

A fourth embodiment of the present invention will now be described with reference to FIG. 6. In this embodiment, an example of a crosstalk quantity detector according to a second aspect of the invention is disclosed. As shown in FIG. 6, a crosstalk quantity detector 104 of the fourth embodiment includes, in the same manner as in the crosstalk quantity detector of the first embodiment, a pulse generator 1, band-pass filters 2 and 3, amplitude detectors 4 and 5, sample-hold circuits 6 and 7, a differential amplifier 8.

The fourth embodiment differs from the first embodiment in that an output from the video demodulation unit 22 is not inputted to the pulse generator 1, and an output of an L channel signal in the RF region inputted to the video demodulation unit 23 and an output of an R channel signal in the RF region inputted to the video demodulation unit 24 are instead inputted to the pulse generator 1.

Figure 7:
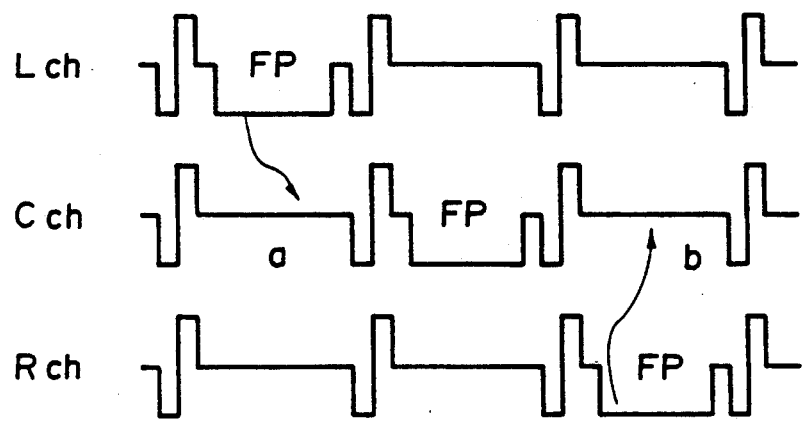
FIG. 7 is a waveform diagram for explaining the operation of the fourth embodiment.

By employing such a circuit configuration, as shown in FIG. 7, a quantity of crosstalk from the L channel can be detected at the point a, and a quantity of crosstalk from the R channel can be detected at the point b. The timing of the detection is determined by the pulses from the pulse generator 1. Here, the frame pulse FP is a pulse signal included in a vertical blanking signal V-BLK for updating a pictorial image of one frame of a television or a video signal for high vision, and corresponds to the crosstalk detecting signal. In this case, each frame pulse FP is formed at three different positions with respect to each normal of the three tracks. The configuration of FIG. 6 is not only applicable to the embodiment where video demodulation units 23 and 24 are added to the first embodiment to alter the connection, but also may be carried out by making use of the second embodiment of FIG. 3 and the third embodiment of FIG. 5.

Fifth Embodiment

Figure 8:
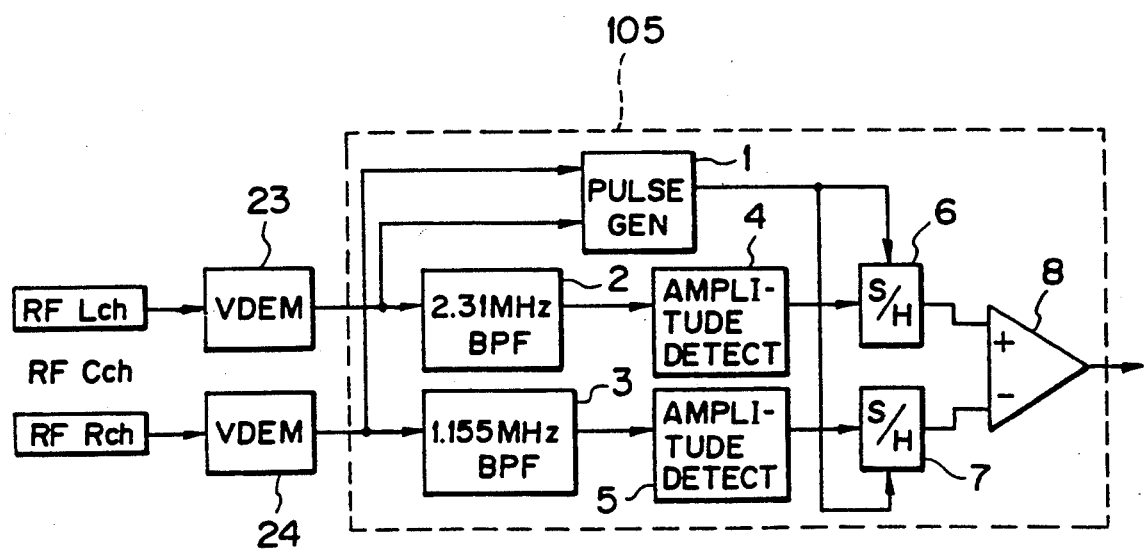
FIG. 8 is a block diagram showing the circuit configuration of a fifth embodiment according to the present invention.

In the above mentioned fourth embodiment, there is shown an example where a quantity of crosstalk from the L channel or R channel into the center channel is detected. In contrast, it is possible to detect a quantity of crosstalk from the center channel into the L channel or R channel. A fifth embodiment of the present invention is shown in FIG. 8. In this embodiment, another example of a crosstalk quantity detector according to the second aspect of the invention is disclosed.

As shown in FIG. 8, this crosstalk quantity detector 105 includes, in the same manner as in the crosstalk quantity detector 101 of the first embodiment, a pulse generator 1, band-pass filters 2 and 3, amplitude detectors 4 and 5, sample hold circuits 6 and 7, and a differential amplifier 8.

The fifth embodiment differs from the first embodiment in that an RF signal of the L channel is inputted to the video demodulation unit 23 in place of inputting an RF signal of the center channel to the video demodulation unit 22 to input that output to the band-pass filter 2, that an RF signal of the R channel is inputted to the video demodulation unit 24 to input that output to the band-pass filter 3, and that respective outputs from the video demodulation units 23 and 24 are inputted to the pulse generator 1.

Figure 9:
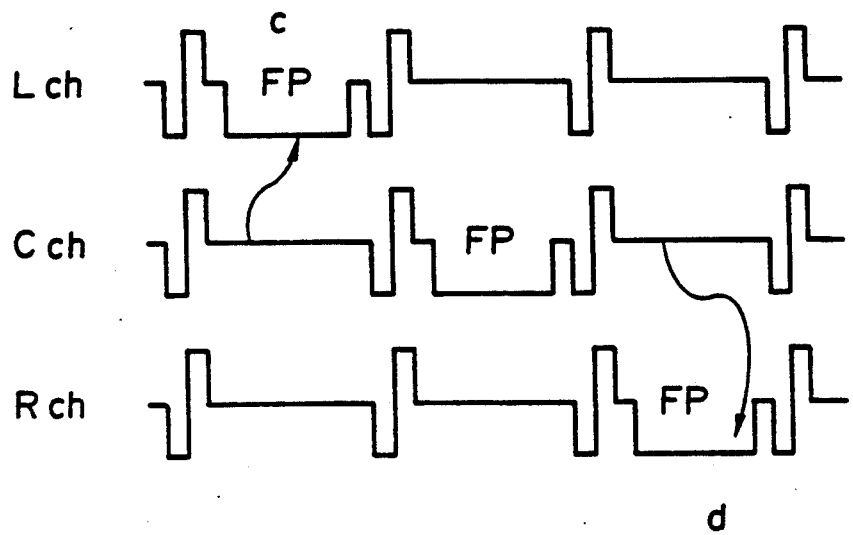
FIG. 9 is a waveform diagram for explaining the operation of the fifth embodiment.

By employing such a circuit configuration, as shown in FIG. 9, a quantity of crosstalk from the center channel to the L channel or the R channel can be detected. In the same manner as in the fourth embodiment, the configuration of FIG. 8 may be realized by making use of the configuration of FIG. 3 or 5.

In the above mentioned crosstalk quantity detector, the spindle motor for rotationally driving an optical disk is in a steady rotational state, so it is necessary to operate the track signal after identified. Accordingly, in implementation, it is required to employ a configuration as shown in FIG. 10.

Figure 10:
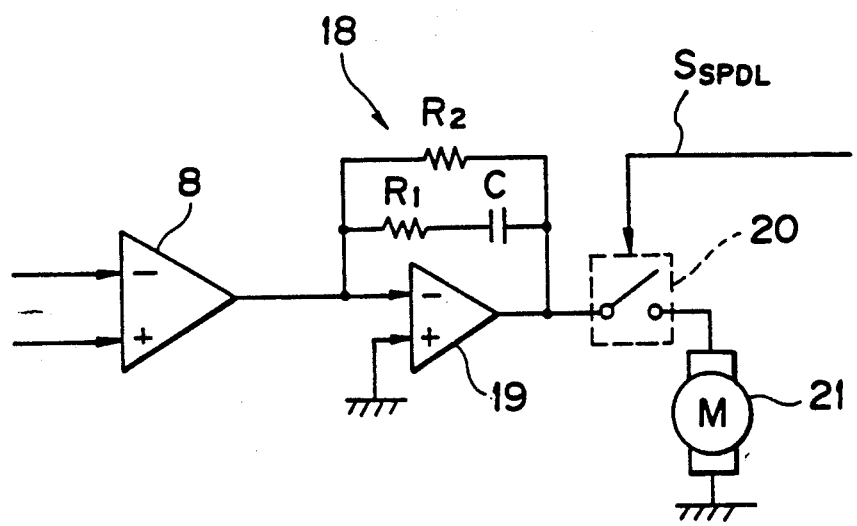
FIG. 10 is a circuit diagram showing an example of the configuration in carrying out the resent invention.
Figure 11A:
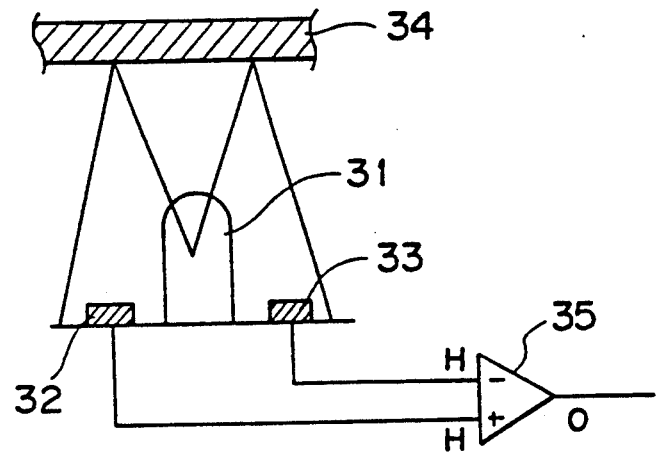
FIGS. 11 (A) and 11 (B) are schematic diagrams showing an example of a conventional optical disk tilt detector, respectively.
Figure 11B:
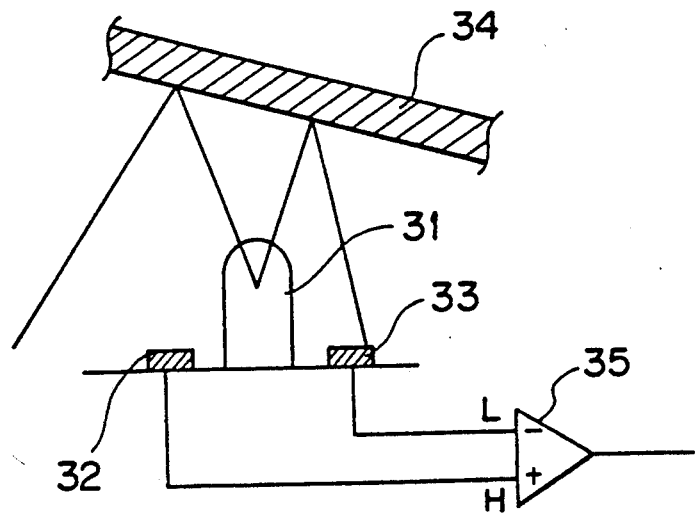

As shown in FIG. 10, an output from the differential amplifier 8 of the crosstalk quantity detector is inputted to a tilt error amplifier 18 and an output from the tilt error amplifier 18 is outputted to a tilt motor 21 through a changeover switch 20. The tilt error amplifier 18 serves as a sort of an active low pass filter including a differential amplifier 19 and an RC network. When the changeover switch 20 is turned ON in response to a signal Sspdl indicating that the servo operation of the spindle motor is turned ON, the tilt motor 21 is driven. As a result, a modification such that an inclination of the disk is canceled is conducted by the tilt motor 21.

The present invention is not limited to the above mentioned embodiments. Namely, a signal for detecting a quantity of crosstalk may be a video modulated signal or a signal in the RF region which dose not undergo video modulation. While it has been described in the above mentioned embodiments that the track ID signal section and/or the frame pulse signal period are used as the detection period, an approach may be employed to generate an exclusive signal for detecting crosstalk to use the period for this exclusive signal. Further, as the detecting method, there may be employed a method of detecting a quantity of crosstalk mixed into the center channel from the L channel or the R channel, or a method of detecting a quantity of crosstalk mixed into the L channel or the channel from the center channel. Further, the number of tracks is not only three but also two or, four or more. In addition, the recording medium is not only optical disk, but also magnetic recording medium such as a magnetic tape, etc..

As described above, in accordance with the present invention, an approach is employed to read signals recorded on the recording medium to process them, thereby making it possible to correctly detect a quantity of crosstalk, and to make the pick up compact because of no necessity of a special detecting mechanism such as a conventional tilt or inclination mechanism.

The present invention may be embodied in other specific forms without departing from the spirit or essential characteristics thereof. The present embodiments are therefore to be considered in all aspects as illustrative and not restrictive, the scope of the invention being indicated by the appended claims rather than by the foregoing description, and all changes which come within the meaning and range of equivalency of the claims are therefore intended to be embraced therein.

What is claimed is:

1. A crosstalk quantity detector for detecting a quantity of crosstalk of signals on the basis of recording signals optically read from an information recording medium having a plurality of parallel and spiral tracks, said recording signals including track ID signals different from each other and recorded at positions in alignment with each other in the perpendicular direction with respect to the adjacent tracks, said detector comprising:

a signal period detector for detecting the track ID signal period from a demodulated signal inputted from a video demodulation unit;

a first filter for extracting, from said demodulated signal, a first signal having a first frequency which is determined on the basis of the track ID signals of a first track and a track adjacent to the first track;

a second filter for extracting, from said demodulate signal, a second signal having a second frequency determined on the basis of the track ID signals of a second track and a track adjacent to the second track; and calculating means for comparing read signal levels of the first signal and the second signal during the detected track ID signal period and outputting the compared result as a quantity of crosstalk of said read signals.

2. A crosstalk quantity detector according to claim 1, wherein said information recording medium comprises two parallel and spiral tracks.

3. A crosstalk quantity detector according to claim 1, wherein said information recording medium comprises three parallel and spiral tracks.

4. A crosstalk quantity detector according to claim 1, further comprising:
   a first hold means for holding a amplitude level of the first signal extracted by the first filter during the detected track ID period; and
   a second hold means for holding an amplitude level of the second signal extracted by the second filter during the detected track ID period.

5. A crosstalk quantity detector according to claim 4, wherein said information recording medium comprises two parallel and spiral tracks.

6. A crosstalk quantity detector according to claim 4, wherein said information recording medium comprises three parallel and spiral tracks.

7. A crosstalk quantity detector according to claim 1, further comprising:
   a first hold means for holding an amplitude level of the first signal extracted by the first filter during the detected track ID period; and
   a second hold means for holding an amplitude level of the second signal extracted by the second filter during the detected track ID period.

8. A crosstalk quantity detector for detecting a quantity of crosstalk of signals on the basis of recording signals optically read from an information recording medium having three parallel and spiral tracks including a center track and adjacent tracks on each side of the center track, said recording signals including track ID signals different from each other and recorded at positions transversely aligned with each other with respect to the three adjacent tracks, said detector comprising:
   a signal period detector for detecting the track ID signal period from a demodulated signal inputted from a video demodulation unit;
   a first filter for extracting, from said demodulated signal, a first signal having a first frequency which is determined on the basis of the track ID signals of the center track and one adjacent track;
   a second filter for extracting, from said demodulate signal, a second signal having a second frequency determined on the basis of the track ID signals of the center track and the other adjacent track; and
   calculating means for comparing read signal levels of the first signal and the second signal during the detected track ID signal period and outputting the compared result as a quantity of crosstalk of said read signals.

* * * * *